United States Patent
Stout et al.

(10) Patent No.: US 6,505,703 B2
(45) Date of Patent: Jan. 14, 2003

(54) VEHICLE STEERING SYSTEM CONTROL

(75) Inventors: Gregory James Stout, Ann Arbor, MI (US); Yixin Yao, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/808,259

(22) Filed: Mar. 14, 2001

(65) Prior Publication Data

US 2002/0129988 A1 Sep. 19, 2002

(51) Int. Cl.[7] .............................. B62D 5/04
(52) U.S. Cl. ..................... 180/446; 180/402; 701/41
(58) Field of Search .................. 180/402, 403, 180/421, 422, 446; 701/41, 42

(56) References Cited

U.S. PATENT DOCUMENTS

| | | | | |
|---|---|---|---|---|
| 5,709,281 A | * | 1/1998 | Sherwin et al. ............ | 180/272 |
| 5,908,457 A | * | 6/1999 | Higashira et al. ........... | 701/41 |
| 5,923,096 A | * | 7/1999 | Manak ...................... | 307/10.1 |
| 6,032,757 A | | 3/2000 | Kawaguchi et al. | |
| 6,041,882 A | | 3/2000 | Bohner et al. | |
| 6,046,560 A | * | 4/2000 | Lu et al. ..................... | 318/432 |
| 6,079,513 A | * | 6/2000 | Nishizaki et al. ........... | 180/402 |
| 6,097,286 A | * | 8/2000 | Discenzo .................... | 340/465 |
| 6,363,305 B1 | * | 3/2002 | Kaufmann et al. .......... | 701/41 |
| 6,370,459 B1 | * | 4/2002 | Phillips ...................... | 180/443 |
| 6,370,460 B1 | * | 4/2002 | Kaufmann et al. .......... | 701/41 |

* cited by examiner

*Primary Examiner*—Kevin Hurley
*Assistant Examiner*—Daniel Yeagley

(57) ABSTRACT

A system (10) and method for controlling a steer-by-wire steering system. The system (10) has a steering wheel control subsystem (12) that provides steering feel for the operator, a reference angle (40) to the road wheels and tracks the road wheel angle. A road wheel control subsystem (14) tracks a steering wheel angle and produces a steering wheel reference angle (32) and torque signal (34) to the steering wheel control subsystem (12). The system and method of the present invention implements the same steering requirements for a steer-by-wire steering system as a conventional steering system and can implement advanced and flexible steering functions that cannot be accomplished with a conventional steering system.

32 Claims, 5 Drawing Sheets

VEHICLE STEERING SYSTEM CONTROL

TECHNICAL FIELD

The present invention relates generally to a steering system for a vehicle and more particularly to a control system for a steer-by-wire steering system.

BACKGROUND OF THE INVENTION

In a steer-by-wire steering system, the vehicle's steering wheel is disengaged from the steering mechanism. In such a steering system, there is no mechanical coupling between the steering wheel and the steering mechanism.

Even though the mechanical linkage between the steering wheel and the road wheels has been eliminated, a steer-by-wire steering system is expected not only to produce the same functions and steering feel as a conventional mechanically linked steering system, but it is also expected to implement advanced steering system features. Requirements for conventional steering functions and advanced steering features such as adjustable steering feel can be implemented by an advanced control system design.

A steer-by-wire control system must satisfy high quality steering requirements and functions, such as a vehicle directional control requirement, a steering wheel to road wheel synchronization requirement, adjustable steering effort functions, stability and adjustable returnability functions, capturing a driver's intent, and adjustable steering feel functions. On the other hand, the resultant control system structure and control strategy must satisfy closed-loop feedback control system requirements and specifications, such as maintaining stability in the face of uncertainties, rejecting disturbance performance, and quick time response performance.

SUMMARY OF THE INVENTION

It is an object of the present invention to control a steer-by-wire steering system for a vehicle. It is another object of the present invention to provide the same functions and feel for an operator of a vehicle having a steer-by-wire system as the functions and feel in a conventional steering system.

It is a further object of the present invention to provide an actuator-based steer-by-wire control system, especially a standard control system structure. It is still a further object of the present invention to provide a steering control system having a steering wheel feedback control subsystem and a road wheel feedback control subsystem.

In carrying out the above objects and other objects and features of the present invention, a steer-by-wire control system is provided that satisfies vehicle steering requirements and the stability and performance requirements. The present invention has a steering wheel control subsystem and a road wheel control subsystem. The subsystems communicate with each other through a subsystem interface.

The steering wheel control subsystem provides the steering feel for the vehicle operator, an angle reference input signal to the road wheel control subsystem, and an active return function with adjustable rates for the steering wheel. The steering wheel control subsystem consists of an inner torque feedback loop, a rate feedback loop and a position feedback loop. The required steering torque that an operator feels is produced by the inner torque loop, the steering wheel rate feedback loop and the steering wheel position feedback loop with programmable steering effort reference curves.

The steering effort reference curves are related to the steering wheel angle, vehicle speed and the torque from the road wheel subsystem. Therefore, in order to reflect the real road condition changes, the road wheel torque signal is used as the feedback signal to form the inner torque feedback loop. A control signal of the road wheel feedback control subsystem can be used as such a torque signal.

In addition to providing the steering feel, the inner torque feedback loop is also used to determine the steering wheel position by working with the other control loops when the operator releases the steering wheel. The position and rate feedback loops also provide an active control function for the variable rate steering wheel return function.

The steering wheel control subsystem provides adjustable steering feel for the operator by controlling the steering torque change in the closed-loop system. It also provides an active, adjustable rate steering wheel return function and the steering wheel positioning function. The steering angle output signal of the steering control subsystem is connected to the road wheel control subsystem as a reference input signal.

The road wheel control subsystem consists of a position feedback control loop and a rate feedback control loop. It is designed as a servo control system so that the road wheel angle tracks the reference input of the steering wheel control subsystem with consideration of the adjustable steering ratio. In order to keep the tracking error in the required minimum range, a gain scheduling control strategy is used to compensate the vehicle dynamics change that occurs with vehicle speed.

The steering wheel control subsystem and road wheel control subsystem are integrated to a steer-by-wire control system by considering the stability and performance of the integrated closed-loop feedback control system. It is a robust control system that can overcome uncertainties and reject disturbances coming from variations in road wheel load, vehicle dynamics, and steering wheel and road wheel systems.

With a steer-by-wire control system, when the vehicle's operator holds or turns the steering wheel, a suitable operator-adjustable steering feel is produced. At the same time, a road wheel angle reference input is given to the actuator-based road wheel feedback control subsystem. The road wheel angle will automatically track the steering wheel angle. When the operator releases the steering wheel, the road wheel angle and torque will be provided as the reference input signal to the steering wheel control subsystem to change the return rate and determine the steering wheel position. In this case, the steering wheel will return to the center or the desired angle by tracking the road wheel angle with the actively desired return rates.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF PREFERRED EMBODIMENTS

Figure 1:
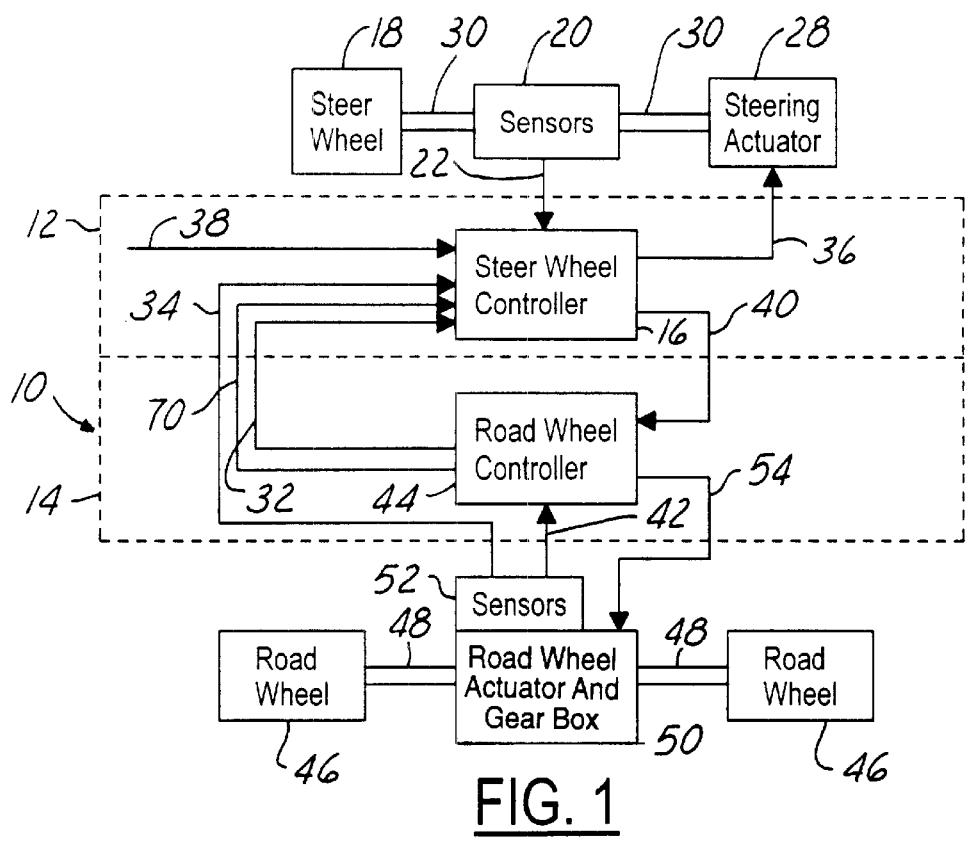
FIG. 1 is a schematic diagram of the steer-by-wire system of the present invention.

FIG. 1 shows a schematic diagram of the steer-by-wire control system of the present invention. The steer-by-wire control system 10 has a steering wheel feedback control subsystem 12 and a road wheel feedback control subsystem 14. The steering wheel feedback control subsystem 12 has a steering wheel controller 16 having inputs from a plurality of sensors 20 and output to a steering wheel actuator 28. In a typical steering system, a shaft 30 connects a steering wheel 18, the sensors 20 and the actuator 28.

The inputs from the sensors 20 include, but are not limited to, a steering wheel angle 22. Another valuable input may be steering torque for example. Other inputs to the steering wheel controller 16 include vehicle sensor variables 38, such as vehicle speed, and potentially lateral acceleration and yaw rate.

A steering wheel reference angle 32 from the road wheel control subsystem 14, and a road wheel torque 34 from the road wheel control subsystem 14 are also inputs to the steering wheel controller 16. The steering wheel controller 16 provides a road wheel reference angle 40 to the road wheel control subsystem 14. The steering wheel controller 16 also provides a controlled input torque command 36 to the steering actuator 28.

The road wheel feedback control subsystem 14 has a road wheel controller 44 having inputs from and outputs to at least two road wheels 46 having a hardware connection 48 therebetween, a road wheel actuator 50 and a plurality of sensors 52. The sensors 52 are for sensing the road wheel torque 34 in one embodiment, and an actual road wheel angle 42.

The inputs to the road wheel controller 44 include the road wheel angle 42 and the road wheel reference angle 40 supplied by the steering wheel control subsystem 12. The road wheel controller 44 provides a road wheel torque control signal 54 as an output to the road wheel actuator 50. The control signal 70, the road wheel torque 34 and the steering wheel reference angle 32 are sent to the steering wheel controller 16 by the road wheel controller 44.

The road wheel reference angle 40 can be considered a control objective for the road wheel control subsystem 14. The road wheel control subsystem 14 controls the vehicle's wheels as closely as possible to the desired road wheel reference angle 40 by minimizing the difference between the actual road wheel angle 42 and the road wheel reference angle 40 provided to the road wheel controller 44.

Referring still to FIG. 1, the subsystems 12 and 14 of the steer-by-wire control system 10 work integrally to implement the steering functions and satisfy the closed-loop specifications. As a steering control system 10, the present invention can implement the same steering requirements as a conventional steering system.

According to the present invention, when an operator (not shown) holds or turns the steering wheel 18, an adjustable steering feel is produced with a controlled steering torque command 36 from the steering wheel control subsystem 12. At the same time, the road wheel reference angle 40 from the steering wheel control subsystem 12 is produced to turn the road wheel angle 42 of the road wheel subsystem 14 with due consideration of a programmable steering ratio.

When the operator releases the steering wheel 18, the road wheel angle 42 will be provided as the reference input signal 32 to the steering wheel control subsystem 12. At the same time, the road wheel torque signal 34 will also give positioning information for the steering wheel 18. In this case, the steering wheel 18 will return to a center, or desired angle, by tracking the road wheel angle 42 with the desired, and adjustable, return rate.

Figure 2:
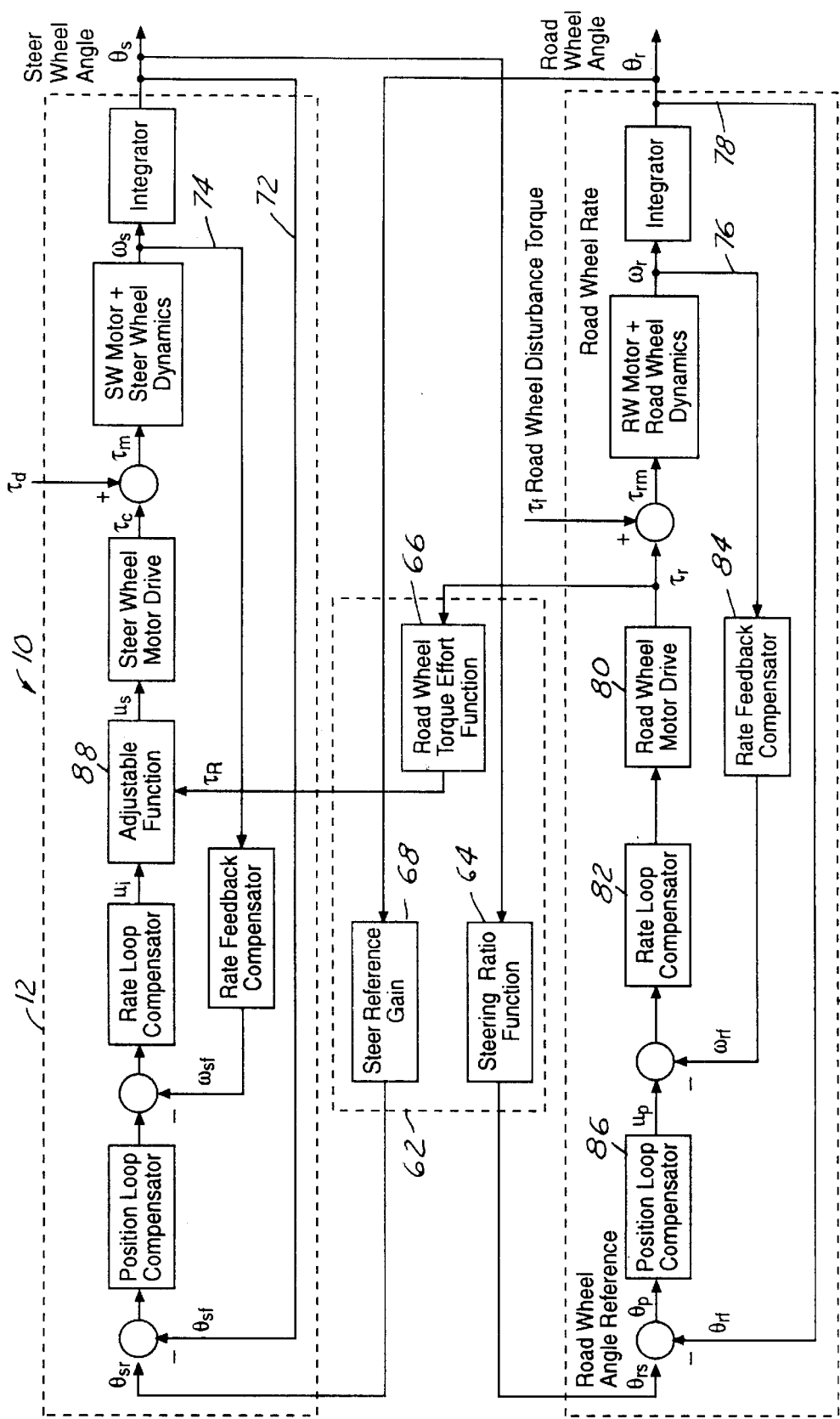
FIG. 2 is a block diagram of the steer-by-wire control system of the present invention.

FIG. 2 is a block diagram of the steer-by-wire control system 10 of the present invention. The steering wheel feedback control system 12 and the road wheel feedback control system 14 are integrated through a subsystem interface 62. The subsystem interface 62 includes a variable steering ratio function 64, a variable road wheel torque effort function 66, and a steering reference gain 68, that are all used to integrate the steering wheel and road wheel feedback control systems 12 and 14 respectively.

The operator turns the steering wheel feedback actuator (not shown in FIG. 2) indirectly when the steering wheel is turned. This action is regarded as a disturbance torque, $\tau_d$, to the closed-loop feedback subsystem 12. The subsystem 12 produces a reaction torque, $\tau_c$, In an attempt to reject the disturbance torque, $\tau_d$. Thus, the operator holding the steering wheel can feel the change in the reaction torque, $\tau_c$. By automatically adjusting parameters of the closed-loop control system that are related to the steering system and vehicle variables, the reaction torque, $\tau_c$, will change. Examples of the parameters include, but are not limited to, the steering wheel angle, the road wheel torque and the vehicle speed in real time. In this regard, the present invention produces a favorable steering feel by generating the required reaction torque, $\tau_c$, as feedback to the driver's action, or disturbance torque, $\tau_d$.

According to the present invention, the operator's action is considered a disturbance torque. The control system structure and strategy of the present invention is designed to reject the disturbance torque and thereby provide a smooth steering performance for the vehicle's operator.

The steering wheel control subsystem 12 provides adjustable steering feel for the vehicle operator by controlling a reaction torque change in the closed-loop feedback system. The steering torque change comes from the combination of the closed-loop gain value, gain limitation value and road wheel torque in the feedback control system of the present invention.

The reaction torque, $\tau_c$, can be adjusted by changing the parameters of the steering wheel closed-loop feedback subsystem 12. It should be noted that the parameters may be changed, but the requirements of the control system stability and performance should remain satisfied and may limit the changes that can be made to the parameters. As a result of parameter changes, the operator will feel a change in the reaction torque, $\tau_c$, when the operator holds or turns the steering wheel. Changing the closed-loop gain and gain limitation values of the steering wheel control subsystem 12 according to the present invention will produce an adjustable controlled steering reaction torque.

The gain adjustments can be automatically implemented through multiple programmable torque curves that provide a range of adjustable steering feel for the operator to choose. Torque curve equations are used in a control loop 74 to automatically change the gain and the gain limitation values as the vehicle's speed and dynamic characteristics change. The torque curves are related to vehicle variables that may include, but are not limited to, the steering wheel angle, $\theta_s$, steering wheel rate, $\omega_s$, road wheel torque, vehicle speed, yaw rate and lateral acceleration.

Figure 3:
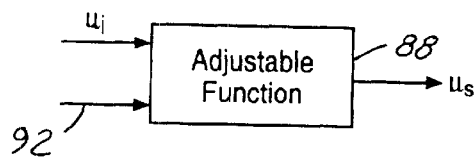
FIG. 3 is a block diagram of an adjustable function of the present invention.
Figure 4:
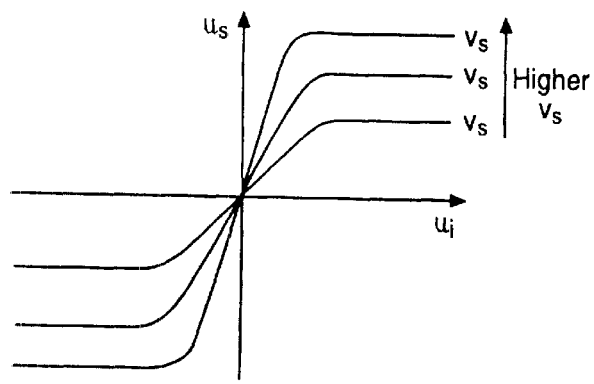
FIG. 4 is a graph representing the adjustable function shown in FIG. 3.

FIGS. 3 and 4 illustrate the adjustable function block 88 (shown in FIG. 2). FIG. 3 shows a block diagram of the adjustable function 88 for the controlled steering torque using an input $u_i$, that is proportional to the steering wheel angle, $\theta_s$, along with other vehicle variables 92 to produce an output signal, $u_s$, that is proportional to the steering wheel reaction torque, $\tau_c$. FIG. 4 is a graph of the adjustable function controlled steering torque with respect to vehicle speed, $v_s$.

Referring back to FIG. 2, changing the closed-loop gain and gain limitation values in the steering wheel control subsystem 12 of the present invention will produce an adjustable steering reaction torque from the adjustable function 88. In summary, multiple programmable torque curves can provide a range of adjustable steering feel for the operator. The predetermined torque curves are used in the control loop to change the gain and gain limitation values automatically. The torque curves are related to vehicle parameters such as the steering wheel angle, the vehicle speed, the rate of turning, lateral acceleration, and forces generated in the road wheel subsystem 14.

The torque curves may be applied in several ways. Generally, the curves are stored in the controller's memory. They may or may not be selectable by the operator. The curves may take the form of a table stored in memory, or they may be adaptive curves based on various parameters that change as the dynamic state of the vehicle changes. The curves may also be analytical curves based on equations whose variables are influenced by the feedback variables of the present invention.

The road wheel torque signal 34 can reflect the real road condition changes. The road wheel torque 34 is used as a feedback signal to help the steering wheel controller 16 determine realistic road feedback to the vehicle's operator. The road wheel torque 34 is the steering torque on a steered road about an axis of the road wheels. It is roughly equivalent to the steering forces that cause the vehicle to steer. In a steer-by-wire system it is generally desirable for the steering wheel to feel connected and proportional to the road wheel steering forces as in a conventional steering system. While the present example is described herein using road wheel torque 34 it should be noted that any equivalent information proportional to road wheel torque 34 is also acceptable.

The road wheel torque signal 34 can be obtained using different types of direct measurement torque or force sensors (not shown). The signal can also be obtained by calculation based on motor current sensors as described in U.S. Pat. No. 5,908,457 "Automobile Steering System Including Reaction Feedback to Operator".

Referring to FIG. 1, the patent describes the use of a control signal 70 in the road wheel feedback subsystem as the road wheel torque signal 34. The control signal 70 is proportional to the road wheel torque signal 34 and a motor current signal (not shown). The control signal 70 can change according to the road wheel system operating conditions, external disturbances and road conditions. The advantages of using control signal 70 include lower cost because it is not necessary to add hardware or interfaces to the subsystem, low noise and high signal quality, and the ease in implementing and obtaining the signal.

Figure 5:
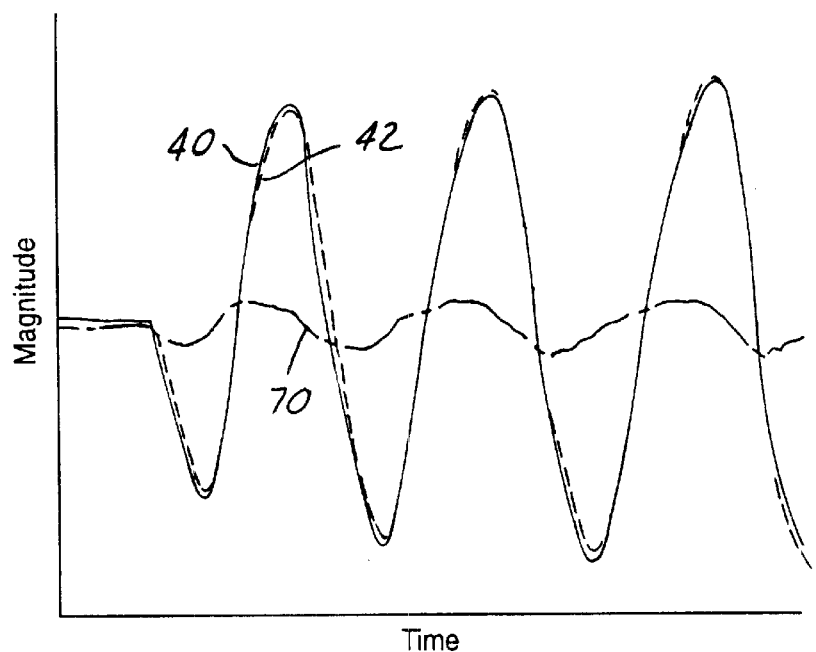
FIG. 5 is a graph of the time responses for the control signal of the road wheel control subsystem, road wheel angle and the road wheel reference angle according to the present invention.

FIG. 5 is a graph of the time responses of the control signal 70 described above used in the feedback system of the present invention. The road wheel angle 42 and the road wheel reference angle 40 are shown in comparison to the control signal 70. In an alternative embodiment, force or torque sensors at the road wheel or actuator can be used to obtain the road wheel torque signal.

Figure 6:
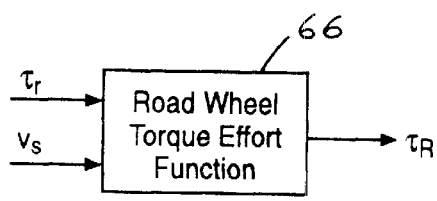
FIG. 6 is a block diagram of the road wheel torque effort function of the present invention.

The road wheel control signal that represents the road wheel torque, $\tau_r$, is processed in a road wheel torque effort function block 66 shown in FIG. 2. FIG. 6 is a block diagram of for the road wheel torque effort function 66, which determines the appropriate value of the road wheel toque effect signal, $\tau_R$, based on the vehicle speed, $V_s$ and road wheel torque $\tau_r$ signals.

In the road wheel feedback control system 14, which is an actuator based system, a road wheel back-drive torque exists due to the mechanical structure with gears or other assemblies. The road wheel back-drive torque produces a large friction-like force that resists movement of the road wheels. As a result, the steering wheel returnability is degraded. This problem is solved in the present invention by using the steering wheel control subsystem 12 and its position and rate feedback loops 72 and 74 respectively to produce an active torque to compensate the back-drive torque. Therefore, the position and rate feedback loops 72 and 74 produce the adjustable steering wheel return rate by giving the actuator-based road wheels back-drive torque compensation.

Referring again to FIG. 2, the steering wheel feedback control subsystem 12 has three feedback loops. The equivalent road wheel torque signal, $\tau_R$, is used to form an inner torque feedback loop. The functions of this loop are mainly to provide adjustable steering feel and effort. This torque regulation feedback control loop plays an important role in changing the road wheel torque effort for the steering wheel control subsystem 12. It also provides a positioning function when the operator releases the steering wheel. The steering wheel angle, $\theta_s$ and the steering rate, $\omega_s$ are used to form the position feedback loop 72 and the rate feedback loop 74. These loops 72 and 74 are used mainly to produce the adjustable steering wheel return rate. When the vehicle's operator releases the steering wheel, the steering wheel will return to a predetermined angle corresponding to the road wheel angle. The loops 72 and 74 provide feedback control in order to improve the returnability under the effect of the road wheel back-drive torque.

Referring still to FIG. 2, the steering wheel control subsystem 12 is connected to the road wheel control subsystem 14 through the road wheel reference angle $\theta_{rs}$. The road wheel reference angle $\theta_{rs}$, after consideration of a programmable steering ratio 64 and any other dynamic factors, is used to determine a desired reference point for the road wheel control subsystem 14. Therefore, when the vehicle's operator holds or turns the steering wheel, the operator can directly control the road wheel angle $\theta_r$.

The steering wheel reference angle $\theta_s$ output from the steering wheel feedback control subsystem 12 is multiplied by a steering ratio function 64 and is used as the road wheel angle reference input $\theta_{rs}$ for the road wheel control subsystem 14. The steering ratio function 64 provides either a constant or variable gain depending on the steering system requirements. The variable steering ratio function can be realized using a variable steering ratio function block. The variable steering ratio function is shown in FIGS. 7 and 8.

Figure 7:
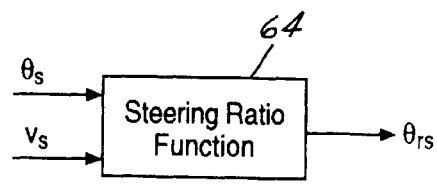
FIG. 7 is a variable steering ratio function block according to one embodiment of the present invention.
Figure 8:
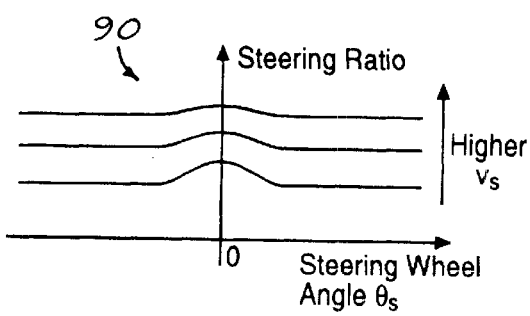
FIG. 8 is a schematic diagram of a group of variable steering ratio function curves.

FIG. 7 is a variable steering ratio function block 64 that provides a road wheel reference angle $\theta_{rs}$ based on the steering wheel angle $\theta_s$ and a vehicle speed, $v_s$. The details of the function 64 are determined by the requirements of the steering system and will vary from one system to another. FIG. 8 is a schematic diagram of a group of variable steering ratio function curves 90, which vary with vehicle speed, $V_s$. The different steering ratio curves are specified according to the steering system requirements and may vary significantly from the example shown in FIG. 8.

Referring again to FIG. 2, the road wheel feedback control subsystem 14 consists of a rate feedback inner loop 76 and a position feedback outer loop 78. The inner loop 76 includes a road wheel motor drive 80, a rate feedback compensator 82 and a rate loop compensator 84. The position feedback outer loop 78 includes all of the rate feedback inner loop 76 and a position loop compensator 86. The output of the road wheel feedback control system 14 is the road wheel angle, $\theta_r$. The road wheel angle $\theta_r$ is multiplied by a steering reference gain 68 and is fed back to the steering wheel control subsystem 12 as the steering wheel reference angle input signal $\theta_{sr}$.

The road wheel control subsystem 14 is designed as a servo control system. A basic property of a servo control system is the ability of an output signal to track a reference input signal. Therefore, in the present invention, the road wheel angle $\theta_r$ 42 tracks the reference input from the steering wheel reference angle $\theta_{sr}$ 32 of the steering wheel control subsystem 12 with consideration of an adjustable steering ratio.

The servo control system of the road wheel control subsystem 14 provides a servo stiffness to satisfy the tracking performance such that static and dynamic errors meet required specifications. The servo stiffness design specification requires that the tracking error is less than the required error angle based on a maximum disturbance torque of the road wheel control subsystem 14. The tracking performance can be further improved by increasing the stiffness of the servo in the control system.

Figure 9:
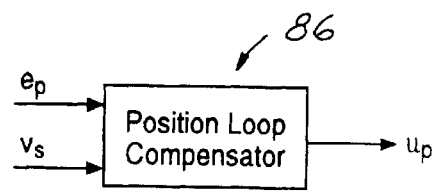
FIG. 9 is a block diagram of a gain scheduling function according to one embodiment of the present invention.

The dynamics of the road wheel subsystem 14 change with changes in road conditions, vehicle loads, and other external circumstances. In particular, the system dynamic gain changes significantly with some factors such as vehicle speed. These uncertainties can degrade the road wheel control subsystem performance if not accounted for. In the present invention a gain scheduling control strategy is used in the road wheel control subsystem in order to guarantee satisfactory tracking performance. FIG. 9 is a block diagram of a gain scheduling function that is related to vehicle speed, $v_s$. A position error signal, $e_p$ is used along with the vehicle speed in a position loop compensator 86 to provide a position control signal, $u_p$.

The present invention can also implement more advanced and flexible features. The control system of the present invention can provide steering feel that is typical of many different vehicles through a steering feel tuning interface. Additionally, the two control subsystems can be operated independent of each other to accomplish special steering tasks.

Figure 10:
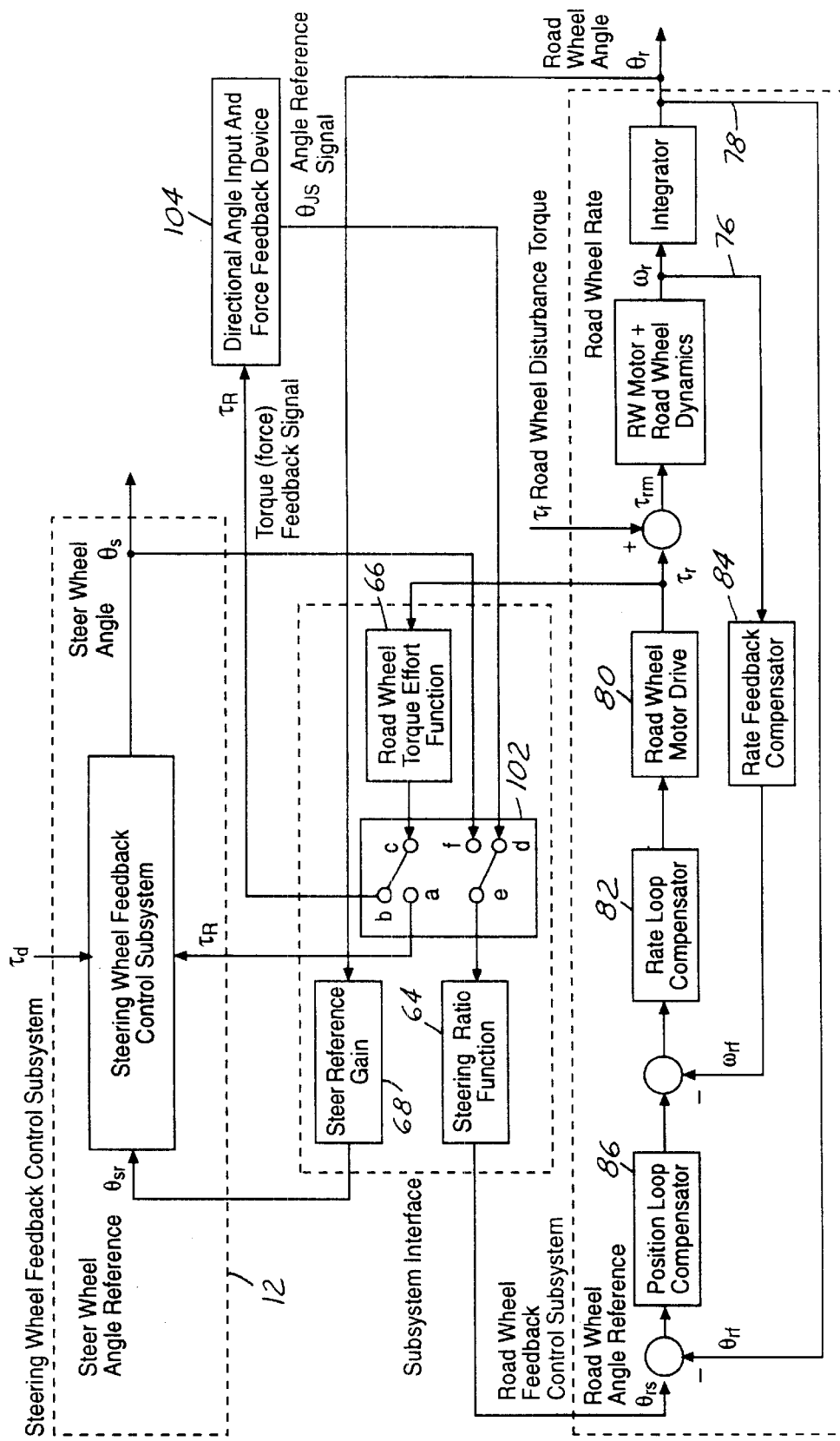
FIG. 10 is a block diagram of an embodiment of the steer-by-wire control system.

FIG. 10 is one example of a more advanced steering system. (Like reference numbers in FIG. 10 represent like elements as referenced in FIG. 2). Using a smooth transfer switch 102, the operator can directly control the road wheel subsystem 14 by replacing the steering wheel angle $\theta_s$ from the steering wheel control subsystem 12 with a manual input angle reference signal $\theta_{Js}$. The manual input angle reference signal $\theta_{Js}$ may be connected to any device such as a joystick, sidesticks (i.e., two joysticks), or any alternate input device.

The switch 102 is provided between the steering wheel control subsystem 12 and a directional angle input device 104, such as a joystick. The output signal of the device 104 is the reference angle $\theta_{Js}$ for the road wheel feedback control system 14. In the example shown in FIG. 10, the joystick device 104 has a force feedback feature that allows the road wheel torque signal, $\tau_R$ to be used as an input to the device 104. The switch 102 is used to select the subsystem 12 or the directional angle input device 104. A smooth bumpless transfer switch is preferred in the embodiment shown in FIG. 10. The smooth transfer switch will reduce and avoid the control signal from producing a pulse during switching.

The joystick, or similar directional angle input device(s), can be used in addition to the steering wheel as an alternative option, or these alternative steering input devices can be used in place of the steering wheel altogether.

Figure 11:
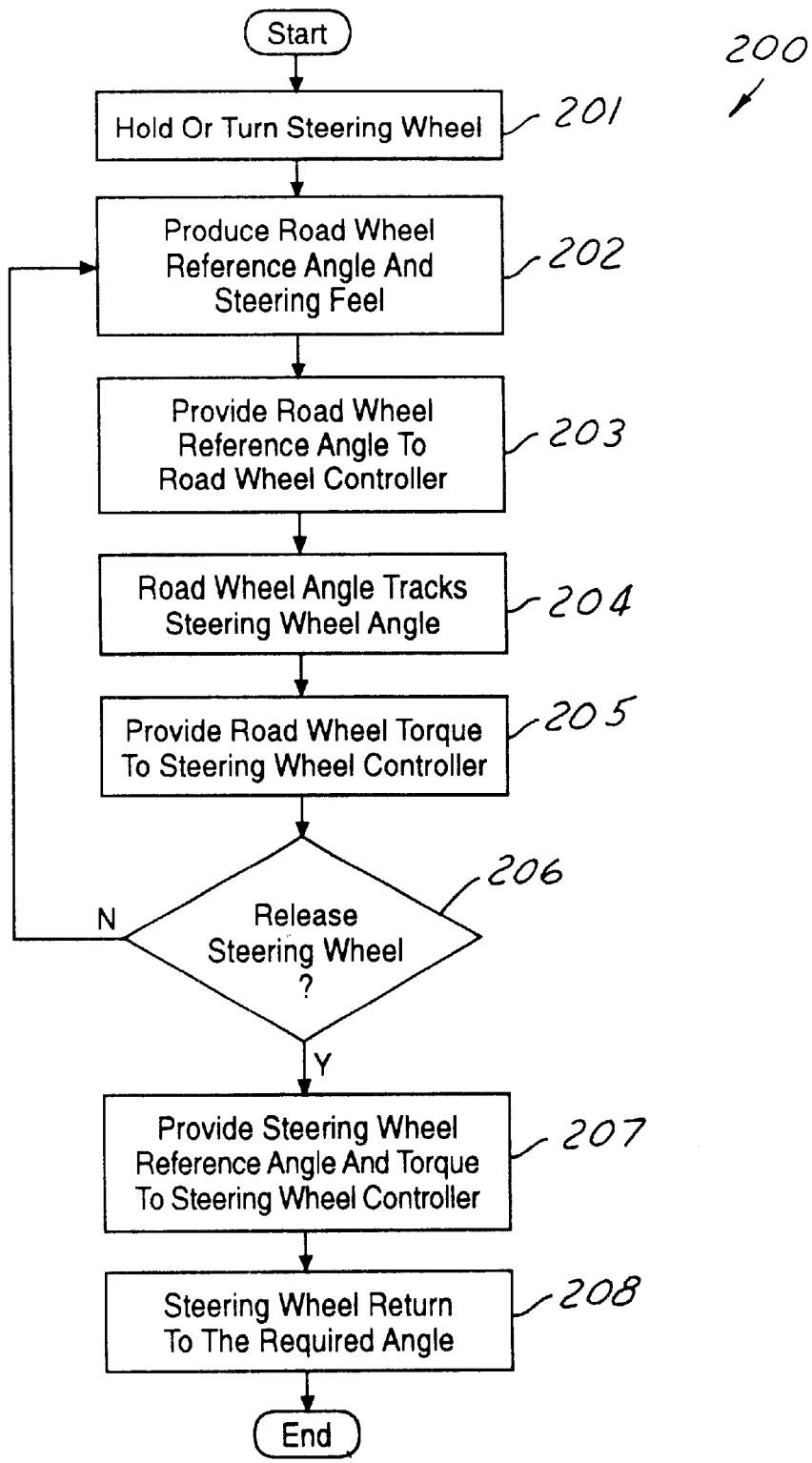
FIG. 11 is a flowchart of the method of the present invention.

The method of the present invention is described with reference to the flow chart 200 shown in FIG. 11. The method 200 translates steering wheel angle into road wheel angle in order to provide the same functions and steering feel for a steer-by-wire vehicle's operator as in a conventional steering system. When a vehicle's operator holds or turns 201 the steering wheel, the steering wheel controller of the present invention produces 202 steering feel for the operator and a road wheel reference angle that is communicated 203 to the road wheel controller. The road wheel controller tracks 204 the reference angle provided from the steering wheel controller. The road wheel controller communicates 205 the road wheel torque to the steering wheel controller to provide information about the torque effort and road conditions. If the steering wheel is not released 206 by the vehicle's operator, the process stated above is repeated. When the steering wheel is released 206 by the vehicle's operator, the road wheel controller provides 207 a steering wheel reference angle to the steering wheel controller as a reference input. The steering wheel will return 208 to the required angle with the adjustable rate. Therefore, the steering wheel control subsystem provides the steering feel for the operator, the road wheel reference input angle for the road wheel controller, and the return function. The road wheel control subsystem tracks the reference input of the steering wheel control subsystem and provides a steering wheel reference input angle and a road wheel torque signal to the steering wheel control subsystem.

The present invention simultaneously satisfies the vehicle steering functions and the stability and performance requirements for a high quality steer-by-wire steering system. The control system of the present invention uses the road wheels to track the steering wheel angle thereby providing directional control. The system provides a suitable steering feel that is comparable to a standard steering system with automatic adjustable features, such as steering wheel return rate and road wheel effort. The present invention also provides a variable steering ratio and active steering wheel return with adjustable rate. Additionally, the present invention provides the ability to control the road wheels through alternative input devices such as a joystick, and provides smooth switching between the steering wheel and the alternative input device. The present invention also provides robust stability despite dynamic vehicle perturbations, uncertainties in road conditions and external disturbances.

The invention covers all alternatives, modifications, and equivalents, as may be included within the spirit and scope of the appended claims.

What is claimed is:

1. A closed-loop control system for a steer-by-wire system on a vehicle having a steering wheel, a steering actuator, a plurality of road wheels, a road wheel actuator, and a plurality of sensors, said control system comprising:
   a first control subsystem for providing a controlled input torque to the steering actuator, said first control subsystem produces a road wheel reference input angle, said first control subsystem has an inner torque feedback loop, an outer position feedback loop, and a rate feedback loop; and
   a second control subsystem that receives said road wheel reference input angle from said first control subsystem, said second control subsystem for providing a controlled input torque to the road wheel actuator, said second control subsystem tracks an angle of the steering wheel and provides a steering wheel reference angle as feedback to the first control subsystem.

2. The control system as claimed in claim 1 wherein said outer position feedback loop and said rate feedback loop produce an adjustable steering wheel return rate.

3. The control system as claimed in claim 1 further comprising an adjustable controlled steering torque.

4. The control system as claimed in claim 3 further comprising a plurality of programmable torque curves that provide a range of adjustable steering torques.

5. The control system as claimed in claim 4 wherein said programmable torque curves further comprise an automatic adjustment to gain and gain limitation values for said first control subsystem as a function of predetermined characteristics and changes to said predetermined characteristics.

6. The control system as claimed in claim 1 wherein said second control subsystem has an inner rate feedback loop and an outer position feedback loop.

7. The control system as claimed in claim 6 wherein said inner rate feedback loop further comprises a road wheel motor drive and a rate feedback compensator and said outer position feedback loop further comprises all of said inner rate feedback loop and a position loop compensator.

8. The control system as claimed in claim 6 further comprising a servo control system.

9. The control system as claimed in claim 8 wherein said servo control system provides a servo stiffness for tracking performance.

10. The control system as claimed in claim 1 further comprising:
    said second control subsystem having an inner rate feedback loop and an outer position feedback loop; and
    a subsystem interface integrated to said first and second control subsystems.

11. The control system as claimed in claim 10 wherein said subsystem interface further comprises:
    a steering ratio function;
    a variable road wheel torque effort function; and
    a steering wheel reference gain.

12. The control system as claimed in claim 11 further comprising:
    said first control subsystem output being modified by said steering ratio function and provided as an input to said second control subsystem; and
    said second control subsystem output being modified by said steering wheel reference gain and provided as an input to said first control subsystem.

13. The control system as claimed in claim 12 wherein said steering ratio function has a constant gain.

14. The control system as claimed in claim 12 wherein said steering ratio function has a variable gain.

15. The control system as claimed in claim 11 wherein said variable road wheel torque effort function further comprises a road wheel torque signal that is measured by a sensor.

16. The control system as claimed in claim 11 wherein said variable road wheel torque effort function further comprises a road wheel torque signal that is obtained through a control signal that is proportional to a road wheel torque signal and that changes according to changes in operating conditions for said plurality of road wheels.

17. The closed loop system as claimed in claim 7 wherein said second control subsystem further comprises a gain scheduling strategy for reducing tracking error and guaranteeing satisfactory tracking performance.

18. The closed loop system as claimed in claim 17 wherein said gain scheduling strategy is based on changes in said second control subsystem due to changes in road conditions.

19. The closed loop system as claimed in claim 17 wherein said gain scheduling strategy further comprises said strategy as a function of vehicle speed and a position error signal in said position loop compensator to produce a position control signal.

20. The closed loop system as claimed in claim 1 wherein said first control subsystem produces a reaction torque in response to a disturbance torque in order to reject said disturbance torque.

21. A closed-loop controller for a steer-by-wire system on a vehicle having a steering wheel, a steering actuator, a plurality of road wheels, a road wheel actuator, and a plurality of sensors, said controller comprising:
    a steering wheel control subsystem for providing a controlled input torque to the steering actuator, said steering wheel control subsystem produces a road wheel reference input angle, wherein said steering wheel control subsystem rejects an external disturbance torque introduced by holding and turning the steering wheel;
    a road wheel control subsystem that receives said road wheel reference input angle from said steering wheel control subsystem, said road wheel control subsystem for providing a controlled input torque to said road wheel actuator, said road wheel control subsystem tracks an angle of the steering wheel and provides a steering wheel reference angle as feedback to said steering wheel control subsystem, said road wheel control subsystem further comprises a position loop and a rate loop to form a servo control system for tracking the road wheel reference angle;
    an interface subsystem for integrating said steering wheel control subsystem and said road wheel control subsystem; and
    wherein said servo control system for tracking the road wheel angle further comprises multiplying said road wheel angle by a steering reference gain to produce a steering wheel reference angle to said steering wheel control subsystem upon release of the steering wheel.

22. The controller as claimed in claim 21 wherein said steering wheel control subsystem further comprises multiplying said steering wheel angle by a steering ratio function to produce a road wheel reference angle to said road wheel control subsystem.

23. The controller as claimed in claim 22 wherein said steering ratio has a constant gain.

24. The controller as claimed in claim 22 wherein said steering ratio has a variable gain.

25. The controller as claimed in claim 24 wherein said variable steering ratio further comprises a plurality of predefined curves stored in memory.

26. The controller as claimed in claim 21 wherein said steering wheel control subsystem has an adjustable controlled steering torque.

27. The controller as claimed in claim 26 wherein said adjustable controlled steering torque further comprises a plurality of predefined torque curves stored in memory.

28. The controller as claimed in claim 26 wherein said adjustable controlled steering torque further comprises a plurality of adaptive curves that change based on parameters defined by dynamic changes in the vehicle.

29. The controller as claimed in claim 21 wherein the steering wheel is a joystick and said road wheel reference angle is a manual input angle signal provided by said joystick.

30. A method for controlling a steer-by-wire system on a vehicle having a steering wheel, a steering actuator, a plurality of road wheels, a road wheel actuator, a plurality of sensors, and a controller, said method comprising the steps of:

receiving an input torque disturbance from the steering wheel;

producing a controlled torque command to the steering actuator;

producing a road wheel reference angle;

using said road wheel reference angle to produce a controlled torque command to the road wheel actuator;

tracking a steering wheel angle;

providing a steering wheel reference angle from said tracked steering wheel angle in an outer position feedback loop and a rate feedback loop to produce the controlled torque command to the steering actuator;

wherein said method rejects said input torque disturbance and produces a controlled steering feel for the vehicle.

31. The method as claimed in claim 30 further comprising the step of applying a plurality of torque curves to produce an adjustable controlled steering torque command to the steering actuator.

32. The method as claimed in claim 30 wherein the steering wheel is a directional angle input device and said method further comprises the step of applying a manual input angle signal in place of producing said road wheel reference angle.

* * * * *